Sept. 15, 1925.
A. F. DOBERNECKER
POULTRY FEEDER
Filed July 2, 1925
1,553,518
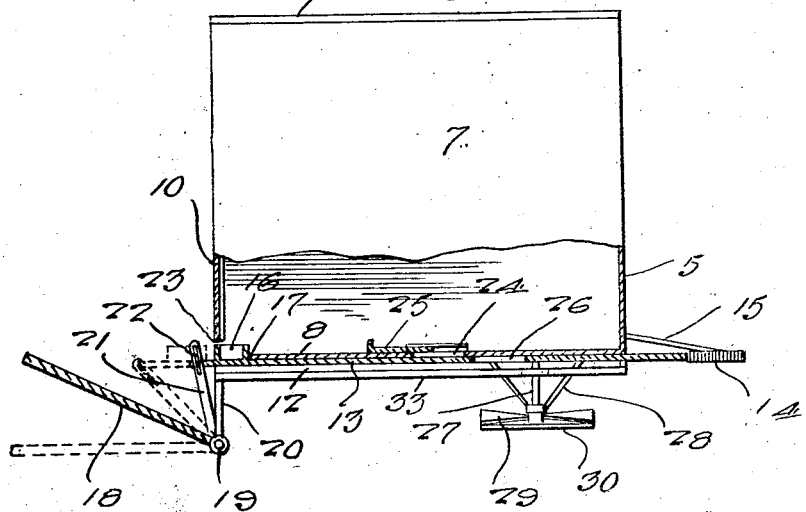
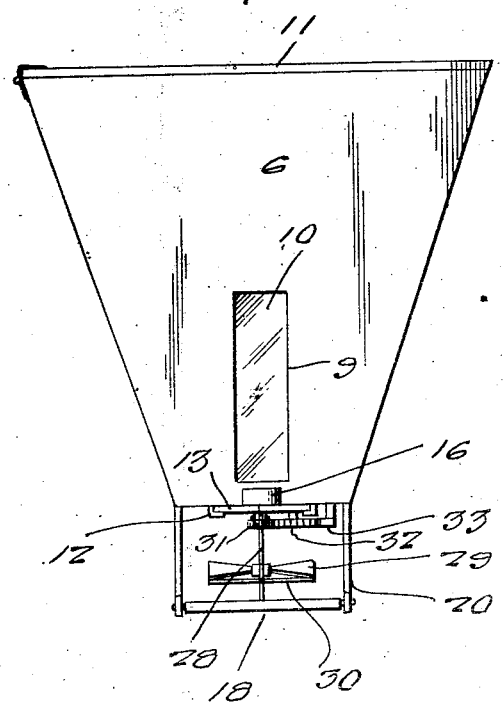
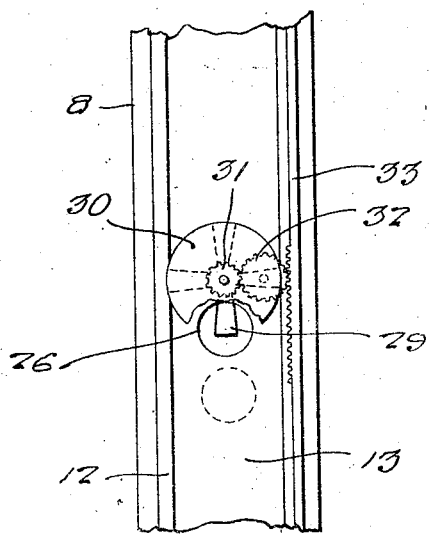
Inventor
A. F. Dobernecker
By Clarence A. O'Brien
Attorney Patented Sept. 15, 1925.

1,553,518

UNITED STATES PATENT OFFICE.

ALBERT F. DOBERNECKER, OF CARSON, IOWA.

POULTRY FEEDER.

Application filed July 2, 1925. Serial No. 41,122.

*To all whom it may concern:*

Be it known that I, ALBERT F. DOBERNECKER, a citizen of the United States, residing at Carson, in the county of Pottawattamie and State of Iowa, have invented certain new and useful Improvements in a Poultry Feeder, of which the following is a specification.

The present invention relates to a poultry feeder, and has for its principal object to provide a structure which will scatter poultry feed by a mechanism actuated by a trip which is placed in motion by one of the chickens.

Another important object of the invention is to provide a feeder of this nature which will cause the chickens to exercise sufficiently to keep them in proper health because of the necessity of actuating the feeder, and the fact that the feed therefrom is scattered.

A still further important object of the invention is to provide a feeder of this nature which is exceedingly simple in its construction, inexpensive to manufacture, thoroughly reliable and efficient in its operation, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described.

In the drawing:—

Figure 1 is a side elevation of the feeder showing the lower portion in section.

Figure 2 is an end elevation thereof, and

Figure 3 is a fragmentary bottom plan view thereof.

Referring to the drawing in detail it will be seen that the hopper includes end walls 5 and 6 and slanting side walls 7 rising from the bottom 8, the end wall 6 being provided with an opening 9 having a suitable transparency 10 therein so that the feed in the hopper may be seen. A hinged closure 11 is provided for the hopper. A pair of spaced parallel cleats 12 are arranged longitudinally of the bottom 8 and receive therein a slide plate 13 which is held in a predetermined position by a spring 14 attached to a suitable bracket 15. A trough 16 is formed on one end of the plate 13 and extends upwardly through an opening 17 provided in the bottom 8 adjacent the end wall 6. A trip 18 is pivoted as at 19 on a depending bracket 20 and has an angularly extending arm 21 having a pin and slot connection at one end of the plate 13, as is indicated at 22. It will be seen that when a chicken flies and lights upon the trip 18, the same will be rocked to the dotted line position in Figure 1, thereby sliding the plate so as to expose the trough 16, and allow the chicken to eat the feed therein. This trough passes outwardly through an opening 23 provided in the wall 6.

An opening 24 is provided in an intermediate portion of the bottom 8 and may be closed by a slide 25 when desired. An opening 26 is provided in the plate 13 and will be brought into registry with the opening 25 when the plate is moved to the dotted line position indicated in Figure 1, and as just described, so that a certain amount of feed will fall through these registering openings. A shaft 27 is journaled in a bracket 28 depending from the bottom 8, and extends vertically having a fan 29 mounted thereon with a disc 30 therebelow. A gear wheel 31 is fixed to the shaft and meshes with a gear wheel 32 journaled from the plate 13 and meshing with a rack bar 33 carried below the hopper in any suitable manner. It will thus be seen that when the plate 13 is moved, the scattering fan is moved therewith, and because of the engagement of gear 32 with rack 33 said scattering fan will be rotated at a relatively fast rate of speed and thus will scatter the feed which drops through the registering openings 24 and 26.

When the chicken which has lighted on the trip 18 flies away, the spring 14 will return the parts to their initial position. The trough 16 is relatively small, and the chicken will not remain very long on the trip 18. This scattering of the feed will give the chicken the proper exercise without the necessity of any attention on the part of the person having charge thereof.

It is thought that the construction, operation, and advantages of this device will now be clearly understood without a more detailed description thereof. The present embodiment of the invention has been disclosed merely by way of example since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

1. In a device of the class described, a hopper provided with a bottom having an opening, a plate slidably mounted on the bottom and provided with an opening, means normally holding the plate so that the openings are out of registry, a trip for operating the plate to place the openings in registry, a rack mounted below the bottom, a span mounted on the plate, and gearing between the fan and the rack so that when said plate is moved then the fan is actuated to scatter feed which falls through the registering openings.

2. In a device of the class described, a hopper, a bottom incorporated in the hopper provided with a pair of openings, a plate slidably mounted on the bottom, a trough on the plate extending into one of the openings, said plate provided with another opening registrable with the other opening of the bottom, means normally holding the plate with the openings out of registry and the trough disposed in the hopper, means for actuating the plate to expose the trough and register the openings, and a scattering mechanism mounted on the plate operable upon the motion thereof.

3. In a device of the class described, a hopper, a bottom incorporated in the hopper provided with a pair of openings, a plate slidably mounted on the bottom, a trough on the plate extending into one of the openings, said plate provided with another opening registrable with the other opening of the bottom means normally holding the plate with the openings out of registry and the trough disposed in the hopper, means for actuating the plate to expose the trough and register the openings, and a scattering mechanism mounted on the plate operable upon the motion thereof, said mechanism being in the form of a fan, a rack fixed to the bottom, and gearing interposed between the rack and the fan.

In testimony whereof I affix my signature.

ALBERT F. DOBERNECKER.